(12) United States Patent
Kajiwara et al.

(10) Patent No.: US 8,309,262 B2
(45) Date of Patent: Nov. 13, 2012

(54) FUEL CELL SYSTEM

(75) Inventors: Shigeto Kajiwara, Okazaki (JP);
Katsuki Ishigaki, Handa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 327 days.

(21) Appl. No.: 12/738,264

(22) PCT Filed: Oct. 14, 2008

(86) PCT No.: PCT/JP2008/068927
§ 371 (c)(1),
(2), (4) Date: Apr. 15, 2010

(87) PCT Pub. No.: WO2009/051252
PCT Pub. Date: Apr. 23, 2009

(65) Prior Publication Data
US 2010/0209794 A1    Aug. 19, 2010

(30) Foreign Application Priority Data

Oct. 17, 2007 (JP) ................................. 2007-270274
Dec. 27, 2007 (JP) ................................. 2007-337517

(51) Int. Cl.
*H01M 8/04* (2006.01)
*H01M 8/10* (2006.01)

(52) U.S. Cl. ........................................ 429/429; 429/432
(58) Field of Classification Search ........................ None
See application file for complete search history.

(56) References Cited

U.S. PATENT DOCUMENTS 7,943,261 B2 * 5/2011 Takebe et al. ................. 429/429
2004/0106025 A1 * 6/2004 Saito et al. ....................... 429/23

FOREIGN PATENT DOCUMENTS

| JP | 2003-045467 A | 2/2003 |
| JP | 2004-179002 A | 6/2004 |
| JP | 2004-179003 A | 6/2004 |
| JP | 2004-335444 A | 11/2004 |
| JP | 2005-073464 A | 3/2005 |
| JP | 2005-332702 A | 12/2005 |
| JP | 2007-066643 A | 3/2007 |
| JP | 2007-128778 A | 5/2007 |
| JP | 2008-152984 A | 7/2008 |

* cited by examiner

*Primary Examiner* — John S Maples
(74) *Attorney, Agent, or Firm* — Kenyon & Kenyon LLP

(57) ABSTRACT

A fuel cell system includes a power supply controller. In response to input of a first command prior to a start of fuel cells in a state of power supply from a power source to fuel cell-related auxiliary machinery, the power supply controller reduces an amount of electric power supplied to the fuel cell-related auxiliary machinery until input of a start instruction to start the fuel cells. In response to input of a second command, the power supply controller instructs to continue the power supply from the power source to the fuel cell-related auxiliary machinery without reducing the electric power level of the power supply, irrespective of the input or non-input of the first command. The fuel cell system of this arrangement effectively reduces the amount of electric power consumed by an electricity storage device before a start of the fuel cells.

4 Claims, 12 Drawing Sheets

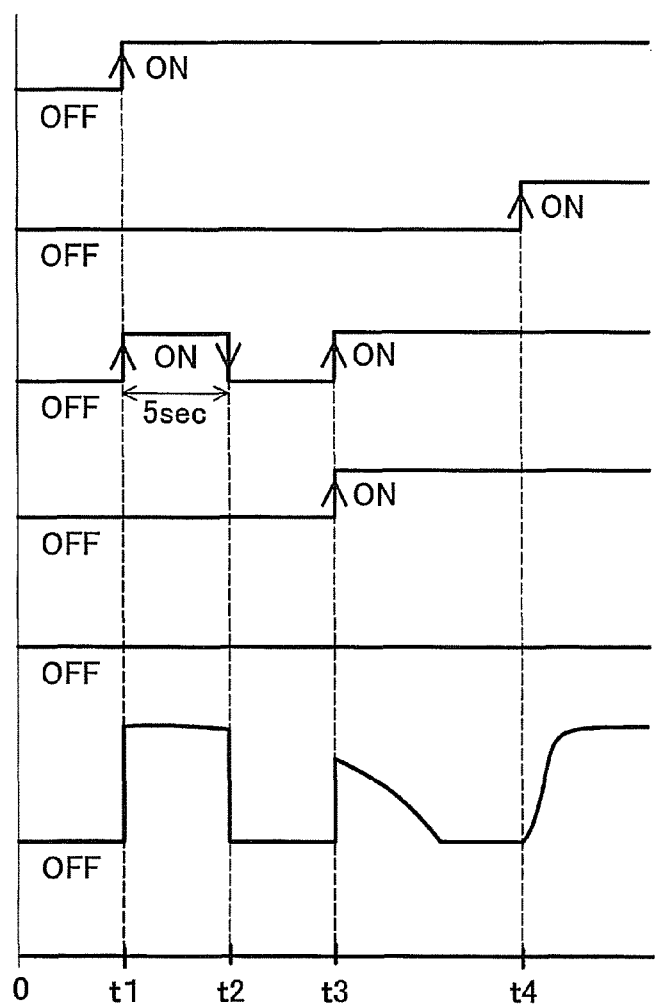
Fig.12A IG SWITCH
Fig.12B START SWITCH
Fig.12C FUEL CELL-RELATED AUXILIARY MACHINERY SWITCH
Fig.12D TEST CONNECTOR
Fig.12E SCANNING TOOL
Fig.12F CELL MONITOR (CELL VOLTAGE)
Fig.12G TIME

FUEL CELL SYSTEM

This is a 371 national phase application of PCT/JP2008/068927 filed 14 Oct. 2008, which claims priority of Japanese Patent Applications No. 2007-270274 filed 17 Oct. 2007, and No. 2007-337517 filed 27 Dec. 2007, respectively, the contents of which are incorporated herein by reference.

TECHNICAL FIELD

The present invention relates to a fuel cell technology.

BACKGROUND ART

A fuel cell system generally includes fuel cells and diversity of auxiliary machinery related to the operations of the fuel cells. The auxiliary machinery include a pump driven to supply a fuel gas required for the operation of the fuel cells, an air compressor driven to supply an oxidizing gas required for the operation of the fuel cells, a cooling water circulation pump driven to control the temperature of the fuel cells, and sensors used to detect the voltage, the temperature, and any other suitable parameters of the fuel cells. The power supply to such auxiliary machinery is accordingly essential at the time of the operations of the fuel cells.

One proposed fuel cell diagnosis device is designed to measure a resistance of fuel cells in an IG-on (ignition-on) condition and subsequently start power supply to a motor (see, for example, Japanese Patent Laid-Open No. 2005-332702, No. 2007-128778, No. 2004-179003, No. 2003-45467, and No. 2007-66643). There is accordingly a requirement for supplying electric power to a sensor used for measuring the resistance of the fuel cells in the IG-on condition.

On a start of the fuel cell system, it is required to supply electric power to the auxiliary machinery related to the operations of the fuel cells. The electric power for the auxiliary machinery is supplied from a power source other than the fuel cells, for example, an electricity storage device such as a low-voltage battery. When there is a long standby time before an ON operation of a start switch (an actual start of the fuel cells) during the measurement of the resistance of the fuel cells in the IG-on condition as disclosed in the above cited patent documents, a large amount of electric power stored in the low-voltage battery is consumed. This leads to a potential for insufficient power supply to the auxiliary machinery on a start of the fuel cells. There would thus a requirement for reducing the power consumption before a start of fuel cells.

SUMMARY

In order to solve such a problem of the prior art technique discussed above, a technique would be required to reduce the power consumption of an electricity storage device before a start of fuel cells in a fuel cell system.

One aspect of the invention provides a fuel cell system, comprising:

a power supply controller configured to, in response to input of a first command prior to a start of fuel cells in a state of power supply at a preset electric power level from a power source to fuel cell-related auxiliary machinery, reduce an amount of electric power supplied to the fuel cell-related auxiliary machinery until input of a start instruction to start the fuel cells, in response to input of a second command, the power supply controller instructing to perform the power supply at the preset electric power level from the power source to the fuel cell-related auxiliary machinery, irrespective of the input or non-input of the first command.

The fuel cell system according to this aspect of the invention reduces the power supply from the power source to the fuel cell-related auxiliary machinery, in response to input of the first command. This arrangement effectively reduces the amount of electric power consumed by the fuel cell-related auxiliary machinery before a start of the fuel cells.

In the specification hereof, the terminology 'fuel cell-related auxiliary machinery' conceptually includes diversity of auxiliary machinery, for example, a pump driven to supply a fuel gas required for the operation of the fuel cells, an air compressor driven to supply an oxidizing gas required for the operation of the fuel cells, a cooling water circulation pump driven to control the temperature of the fuel cells, and sensors used to detect the voltage, the temperature, and any other suitable parameters of the fuel cells. The reduction of the amount of electric power supplied to the fuel cell-related auxiliary machinery may be attained by stopping the power supply to part of the fuel cell-related auxiliary machinery or by stopping the power supply to the whole fuel cell-related auxiliary machinery.

When the second command is input into the power supply controller, the power supply controller instructs to perform the power supply at the preset electric power level from the power source to the fuel cell-related auxiliary machinery, irrespective of input or non-input of the first command. The fuel cell system of this arrangement desirably reduces the consumption of the electric power supplied from the power source. When there is a requirement for the power supply to the fuel cell-related auxiliary machinery, the fuel cell system of the invention inputs the second command to the power supply controller to assure the power supply from the power source included in the fuel cell system without requiring power supply from any external power source.

The fuel cell system, wherein the power supply controller may determine the input of the first command when a state of the fuel cell system reaches a predetermined condition.

For example, the input of the first command may be determined under the condition of a decreased electric power level of the power source. In this case, the predetermined condition may be a specific value representing the decreased electric power level of the power source, for example, a voltage level of the power source. The fuel cell system of this application effectively prevents the insufficient power supply from the power source on an actual start of the fuel cells.

The fuel cell system, wherein the power supply controller may determine the input of the second command when a checkup device for checking up a condition of the fuel cell system is connected with the fuel cell system.

At the checkup time of the fuel cell system, this application assures the continuous power supply at the preset electric power level to the fuel cell-related auxiliary machinery even in the case of the input of the first command. The fuel cell system of this arrangement enables the fuel cell system to be checked up with the electric power supplied from the power source without requiring power supply from any external power source.

The fuel cell system, wherein the power supply controller may stop power supply to a fuel cell monitoring device used for monitoring a condition of the fuel cells, in response to the input of the first command.

In the specification hereof, the terminology 'fuel cell monitoring device' conceptually includes diversity of devices for monitoring the conditions of the fuel cells, for example, a cell monitor arranged to detect a voltage, a temperature, or any other suitable parameter relating to each of unit cells constituting a fuel cell stack, specify the condition of each unit cell, and output information on a certain unit cell having a worst condition to the fuel cell system.

The stop of the power supply to the fuel cell monitoring device reduces the consumption of electric power supplied from the power source. In response to a demand for activating the fuel cell monitoring device, on the other hand, the electric power is supplied from the power source included in the fuel cell system to the fuel cell monitoring device. The fuel cell system of this arrangement utilizes the fuel cell monitoring device to checkup the condition of the fuel cells even in the case of the input of the first command. The fuel cell system, wherein the power supply controller may stop power supply to a fluid pump used for supplying a fluid to the fuel cells, in response to the input of the first command.

The stop of the power supply to the fluid pump reduces the consumption of electric power supplied from the power source. In response to input of the second command, the electric power is supplied from the power source included in the fuel cell system to the fluid pump. For example, the fuel cell system of this arrangement enables a software program for an inverter circuit used for driving the fluid pump to be rewritten without requiring power supply from any external power source even in the input of the first command.

The fuel cell system, wherein the power source may be a low-voltage battery.

The fuel cell system, wherein the predetermined condition may be that a preset time has elapsed between input of a power supply instruction to start the power supply to the fuel cell-related auxiliary machinery and the input of the start instruction to start the fuel cells.

This application is especially preferable in the case where the standby condition continues for a relatively long time period between a start of power supply to the fuel cell-related auxiliary machinery and an actual start of the fuel cells. The fuel cell system of this arrangement thus desirably reduces the power consumption in the standby condition.

The fuel cell system, the fuel cell system further including:
a first operator; and
a second operator,
wherein the power supply instruction may be output in response to activation of the first operator, and the start instruction to start the fuel cells is output in response to activation of the second operator.

The technique of the present invention may be actualized by diversity of applications including a fuel cell system and a vehicle equipped with the fuel cell system.

BRIEF DESCRIPTION OF THE DRAWINGS

FIG. 12 is timing charts showing on-off timings of the respective switches in the fuel cell system 100B.

BEST MODES OF CARRYING OUT THE INVENTION

Figure 1:
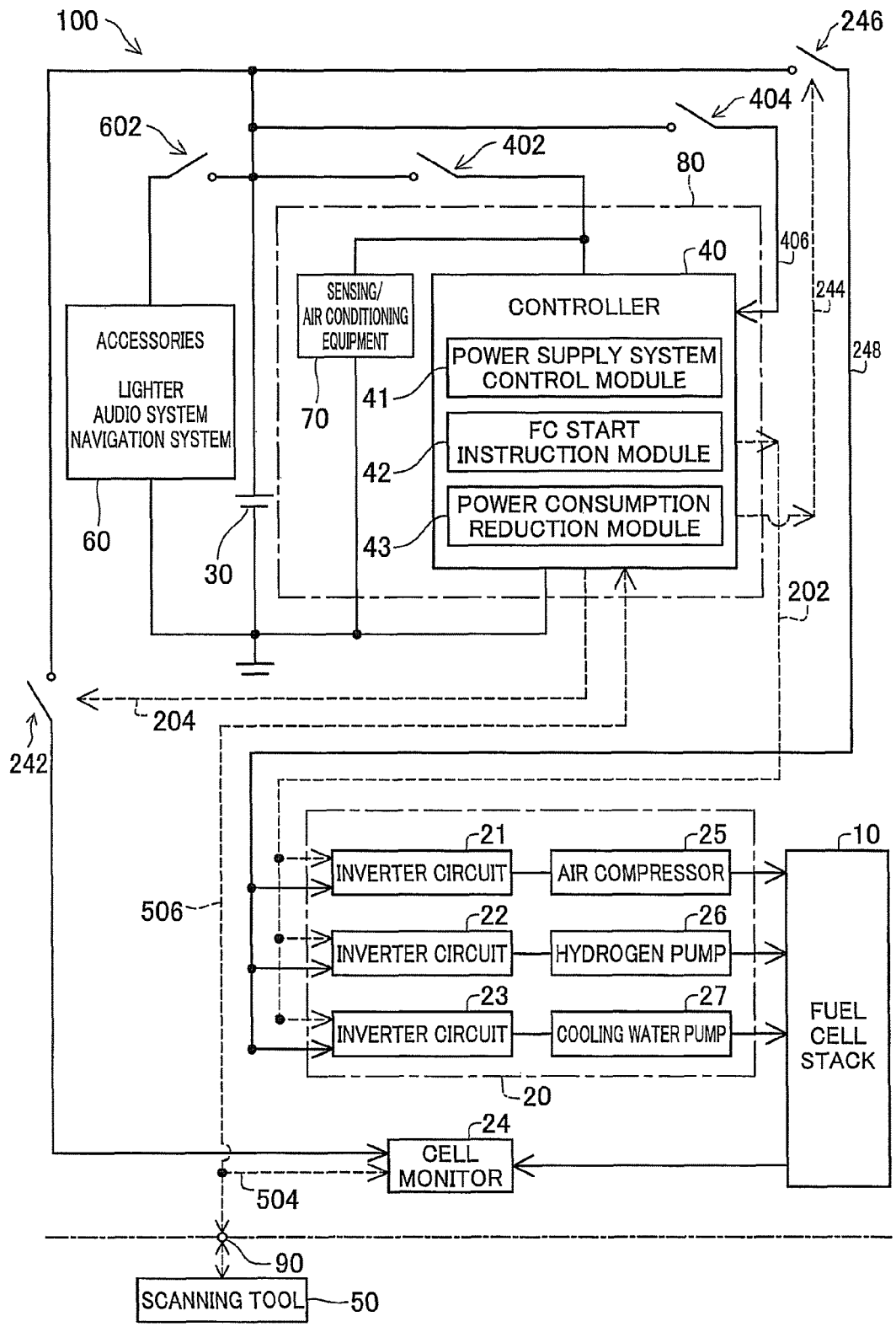
FIG. 1 is an explanatory view illustrating the configuration of a fuel cell system 100 in a first embodiment.

Some modes of carrying out the invention are described below in the following sequence with reference to the accompanied drawings:
A. First Embodiment
B. Second Embodiment
C. Third Embodiment
D. Other Aspects A. First Embodiment A1. Configuration of Embodiment FIG. 1 is an explanatory view illustrating the configuration of a fuel cell system 100. In this embodiment, the fuel cell system 100 is mounted on a vehicle. The fuel cell system 100 mainly includes a fuel cell stack 10, series of pumps 20, a cell monitor 24, a battery 30, a controller 40, and input/output terminals 90. The series of pumps 20 in this embodiment are equivalent to the fluid pump in the claims of the invention. The cell monitor 24 is equivalent to the fuel cell monitor device in the claims of the invention. The combination of the series of pumps 20 with the cell monitor 24 corresponds to the fuel cell-related auxiliary machinery in the claims of the invention.

The fuel cell stack 10 is obtained by stacking multiple polymer electrolyte fuel cells as unit cells. The fuel cell stack 10 generates electric power through an electrochemical reaction of hydrogen as a fuel gas with oxygen in the air as an oxidizing gas. In the configuration of this embodiment, hydrogen is supplied from a hydrogen tank (not shown) as a storage vessel of high-pressure hydrogen to anodes of individual fuel cells in the fuel cell stack 10, while the air compressed by an air compressor 25 is supplied to cathodes of the individual fuel cells in the fuel cell stack 10. The hydrogen tank may be replaced by any hydrogen absorbing alloy or another equivalent component.

The series of pumps 20 include electric instruments used to drive and operate the fuel cell stack 10. Specifically the series of pumps 20 include the air compressor 25 driven to compress the air as the oxidizing gas and supply the compressed air to the fuel cell stack 10, a hydrogen pump 26 actuated to supply hydrogen as the fuel gas from the hydrogen tank (not shown) to the fuel cell stack 10, a cooling water pump 27 actuated to supply cooling water to the fuel cell stack 10 in order to cool down the fuel cell stack 10, and inverter circuits 21, 22, and 23 respectively activated to drive and operate these compressor and pumps.

The cell monitor 24 is used to measure a voltage, a temperature, or another suitable parameter of each of the multiple unit cells constituting the fuel cell stack 10 and informs the controller 40 of information, for example, on a unit cell in a worst condition, thus having contribution to the control of the fuel cell stack 10.

The battery 30 is used to mainly supply electric power to the series of pumps 20, the cell monitor 24, the controller 40, sensing/air conditioning equipment, explained later, and a first group 60, discussed later. In this embodiment, a 14V battery is used for the battery 30. This is, however, neither essential nor restrictive, but the battery 30 may be any power source other than the fuel cell stack 10 and may be a chargeable-dischargeable electricity storage device, such as a low-voltage battery having a voltage other than 14V, a high-voltage secondary battery, or a capacitor.

The controller 40 is constructed as an on-board computer including a microprocessor chip and has the overall control functions for the operations of the respective constituents in the fuel cell system 100, specifically the function of start control of the fuel cell system 100. The controller 40 includes a power supply system control module 41, an FC start instruction module 42, and a power consumption reduction module 43. The power supply system control module 41 controls the operations of the overall fuel cell system 100. The FC start instruction module 42 gives start commands to the series of pumps 20. Here the terminology 'FC' is short for 'fuel cell(s)' and represents the fuel cell stack 10 in this embodiment. The power consumption reduction module 43 controls the operations of an FC inverter switch 246, explained later, and a cell monitor switch 242, explained later, and reduces the amount of electric power consumed until a start of the fuel cell stack 10. The controller 40 executes fuel cell control programs corresponding to the respective modules, so as to actualize the respective functions discussed above. The power consumption reduction module 43 in this embodiment is equivalent to the power supply controller in the claims of the invention.

A scanning tool 50 is connectable to the input/output terminals 90. The scanning tool 50 is a diagnosis device designed to make communication via the input/output terminals 90 when a service representative who is in charge of checking and servicing in an automobile dealer checks for any trouble or fault in the fuel cell stack 10. Connection of the scanning tool 50 with the input/output terminals 90 allows for transmission of signals between the controller 40, the cell monitor 24, and the scanning tool 50. The scanning tool 50 in this embodiment is equivalent to the checkup device in the claims of the invention.

As shown in FIG. 1, the objects of power supply by the battery 30 are broadly divided into four groups. The first group 60 includes diversity of car accessories, such as a lighter, an audio system, and a navigation system, mounted on the vehicle. An accessory switch 602 connects the battery 30 to the first group 60. A manipulation unit for turning on and off the accessory switch 602 is provided in a passenger compartment of the vehicle. A driver of the vehicle or another equivalent person operates the manipulation unit to set the accessory switch 602 in an ON position or in an OFF position. In the ON position of the accessory switch 602, the power supply from the battery 30 to the first group 60 is started to activate the diversity of accessories, such as the lighter.

A second group 80 includes the controller 40 and the sensing/air conditioning equipment 70. The sensing equipment is used to detect the conditions of the respective constituents in the fuel cell system 100 and includes, for example, flowmeters for measuring the flow rates of the fuel gas and the oxidizing gas supplied to the fuel cell stack 10 and a water temperature gauge for measuring the temperature of the cooling water. The air conditioning equipment includes a fan, a heater, and a coolant circulation pump used for air conditioning in the passenger compartment.

An IG switch 402 is provided between the second group 80 and the battery 30. Here the terminology 'IG' is short for 'ignition', which originally represents ignition of an internal combustion engine. The term 'ignition switch' may not be quite suitable for the fuel cell system 100, but has been used for many years in the art as a word meaning a start switch of a vehicle. In view of such background, the term 'IG switch' represents an operator used as a start switch of the vehicle in the specification hereof.

A manipulation unit or turning on and off the IG switch 402 is provided in the passenger compartment of the vehicle. The driver of the vehicle or another equivalent person operates the manipulation unit to set the IG switch 402 in an ON position or in an OFF position. In the ON position of the IG switch 402, the electric power from the battery 30 is supplied to the second group 80 to start the controller 40 and activate the fuel cell control programs. Namely the IG switch 402 is used to direct start of a vehicle control system and is manipulated first by the driver on a start of the vehicle. In the ON position of the IG switch 402, the electric power from the battery 30 is also supplied to the sensing/air conditioning equipment 70. The IG switch 402 in this embodiment is equivalent to the first operator in the claims of the invention.

Separately from the IG switch 402, a start switch 404 is provided between the controller 40 and the battery 30. A manipulation unit for turning on and off the start switch 404 is provided in the passenger compartment of the vehicle. The driver of the vehicle or another equivalent person operates the manipulation unit to set the start switch 404 in an ON position or in an OFF position. An ON-OFF signal of the start switch 40 is transmitted to the controller 40. In response to detection of the ON position of the start switch 404 by the controller 40, an FC start command signal 202 is output to the series of pumps 20 by the function of the FC start instruction module 42. An ON operation of the start switch 404 preceded by an ON operation of the IG switch 402 starts the series of pumps 20 upon satisfaction of required conditions. The start switch 404 in this embodiment is equivalent to the second operator in the claims of the invention.

The third group includes the series of pumps 20 discussed previously. The FC inverter switch 246 is provided between the series of pumps 20 and the battery 30. Unlike the accessory switch 602, the IG switch 402, and the start switch 404 explained above, the FC inverter switch 246 is controlled by the function of the power consumption reduction module 43 in the controller 40, without requiring the driver's manual operation. In an ON position of the FC inverter switch 246, the electric power from the battery 30 is supplied to the inverter circuits 21, 22, and 23. In an OFF position of the FC inverter switch 246, on the other hand, the power supply is stopped.

The fourth group includes the cell monitor 24. The cell monitor switch 242 is provided between the cell monitor 24 and the battery 30. Like the FC inverter switch 246 explained above, the cell monitor switch 242 is controlled by the function of the power consumption reduction module 43 in the controller 40 without requiring the driver's manual operation. In an ON position of the cell monitor switch 242, the electric power from the battery 30 is supplied to the cell monitor 24. In an OFF position of the cell monitor switch 242, on the other hand, the power supply is stopped.

A2. Operations of Embodiment

Figure 2:
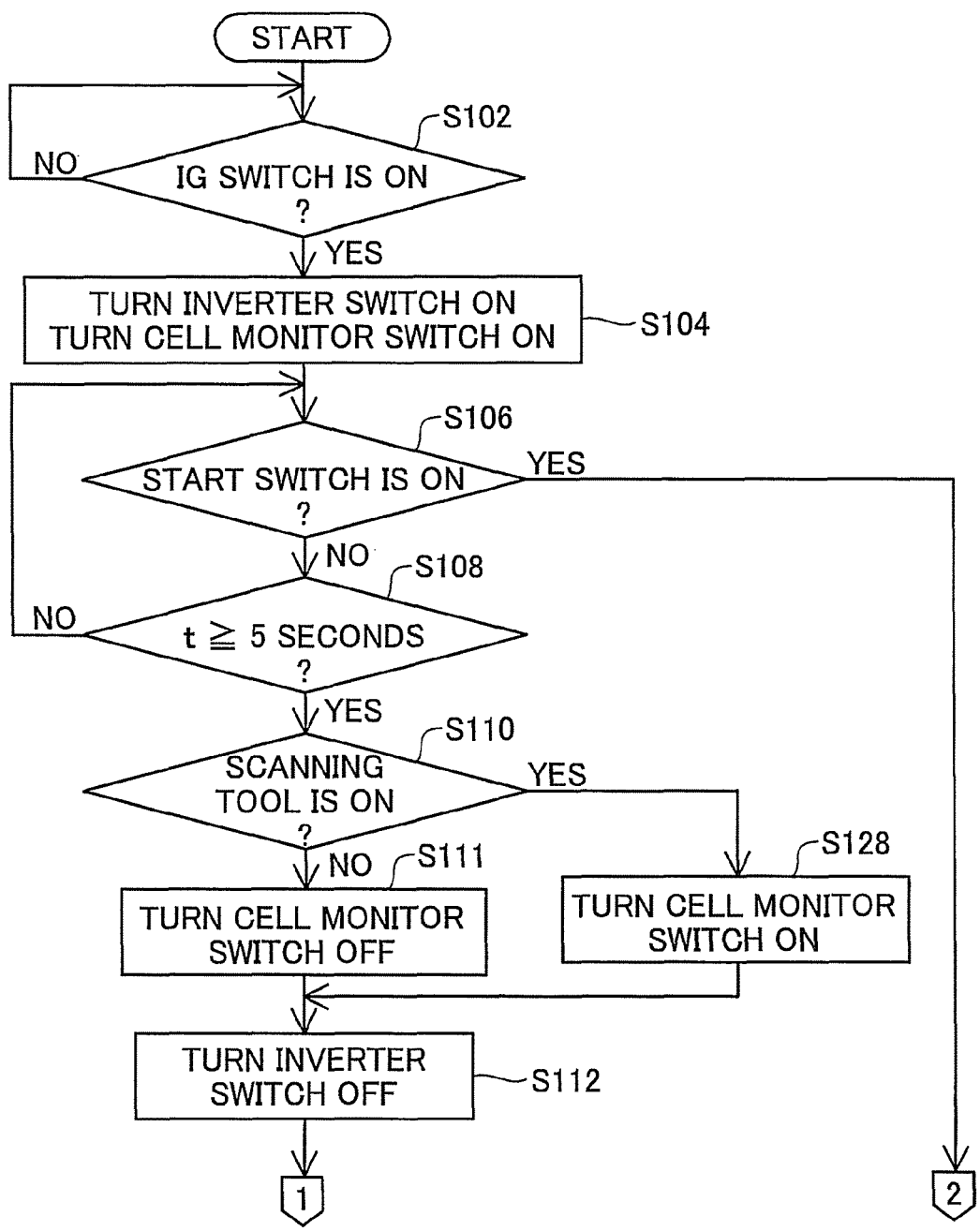
FIG. 2 is a flowchart showing a procedure for reducing the power consumption on a start of the fuel cell system.
Figure 3:
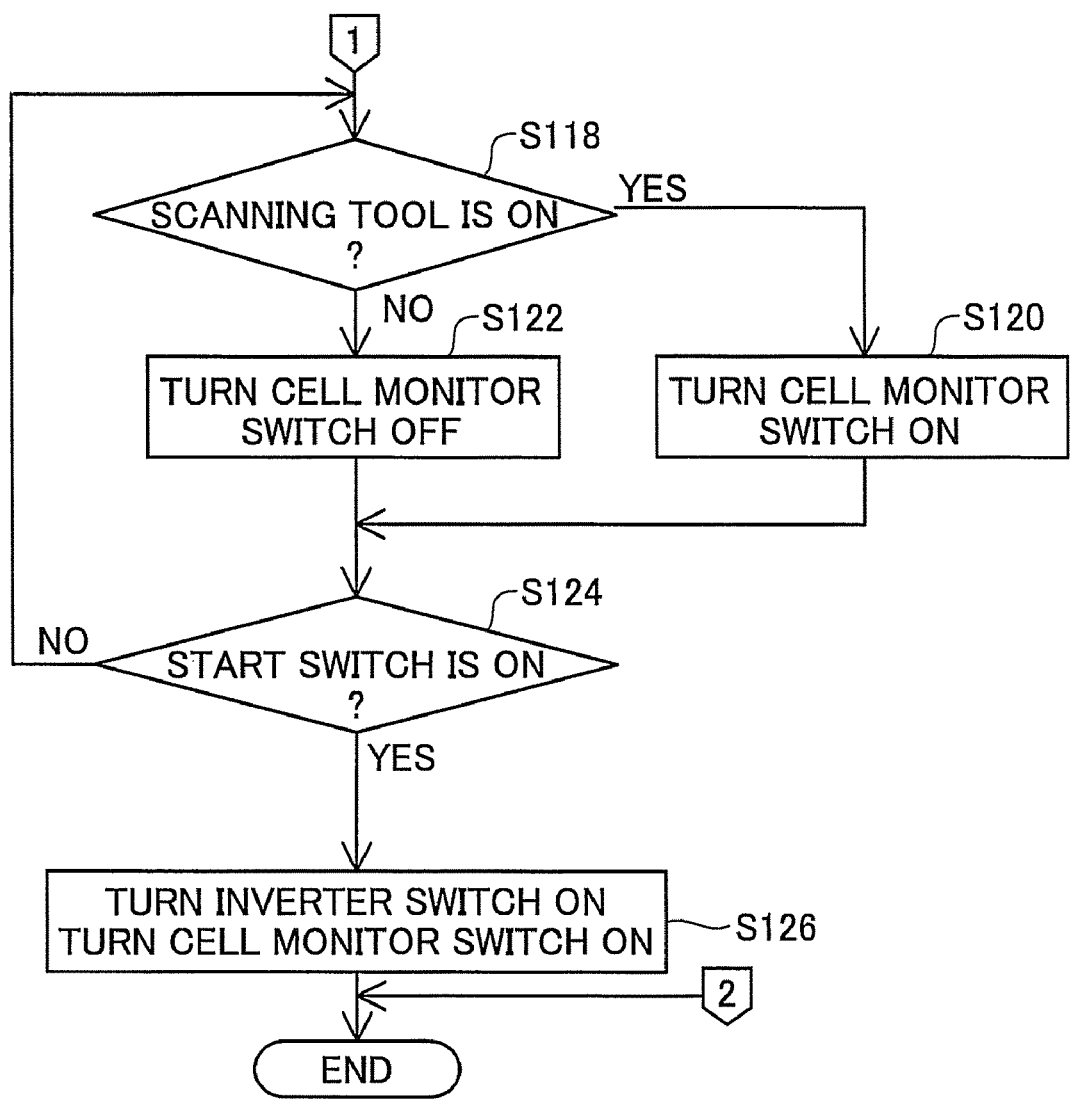
FIG. 3 is a flowchart showing the procedure for reducing the power consumption on a start of the fuel cell system.
Figure 4:
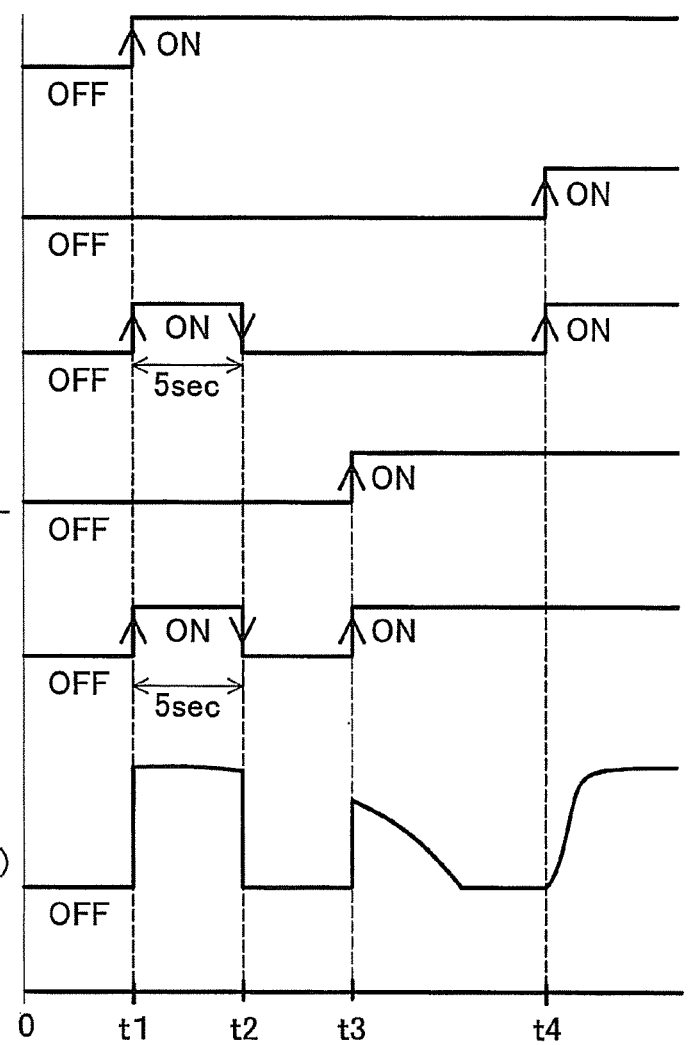
FIG. 4 is timing charts showing on-off timings of the respective switches in the fuel cell system 100.

FIGS. 2 and 3 are flowcharts showing a procedure for reducing the power consumption on a start of the fuel cell system. FIG. 4 is timing charts showing on-off timings of the respective switches in the fuel cell system 100, with the elapse of time from a common zero point as the abscissa and the on-off operations of the respective switches as the ordinate.

At a start time of the fuel cell system 100 in this embodiment, the driver first operates the manipulation unit for the IG switch 402 to turn the IG switch 402 ON and subsequently operates the manipulation unit for the start switch 404 to turn the start switch 404 ON, so as to start the fuel cell system 100.

At a checkup time of the fuel cell stack 10, on the other hand, a checker connects the scanning tool 50 to the input/output terminals 90, operates the manipulation unit for the IG switch 402 to turn the IG switch 402 ON, and powers ON the scanning tool 50. The checker is then informed of the results of the measurement and detection by the cell monitor 24, for example, a cell voltage in the fuel cell stack 10, which are displayed on the scanning tool 50. In response to connection of the scanning tool 50 with the input/output terminals 90 and a subsequent power-ON operation of the scanning tool 50, a power ON signal 506 of the scanning tool 50 is input into the controller 40. The power consumption reduction module 43 then identifies an ON condition of the scanning tool 50, that is, connection of the scanning tool 50 (checkup device).

A procedure of checking the condition of the fuel cell stack 10 in the connected state of the scanning tool 50 with the input/output terminals 90 by the checker is described below as one exemplified operation of the fuel cell system 100 with reference to FIGS. 1 through 4. The checker observes a decrease of the cell voltage after a stop of power generation in the fuel cell stack 10 to detect deterioration of the fuel cell stack 10. According to a concrete procedure, the checker starts the fuel cell stack 10 to perform power generation until a sufficient voltage level and then stops the operations of the fuel cells (by turning the IG switch 402 OFF).

The checker subsequently monitors a decreasing state of the cell voltage with the scanning tool 50 in the ON position of the IG switch 402 and in the OFF position of the start switch 404, that is, in the state of stopping power generation in the fuel cell stack 10. The state of stopping power generation in the fuel cell stack 10 normally leads to a gradual decrease of the cell voltage. An abrupt decrease of the cell voltage within a short time suggests the possibility for deterioration of the fuel cells. The following description is on the assumption that the checker turns ON the IG switch 402 after a stop of the operation of the fuel cell stack 10 and subsequently powers ON the scanning tool 50 after a while.

Referring to FIG. 2, the power consumption reduction module 43 first identifies whether the IG switch 402 is in the ON position or in the OFF position (step S102). When the IG switch 402 shown in FIG. 1 is turned ON to start the power supply from the battery 30 to the controller 40 and activate the controller 40, the IG switch 402 is identified to be in the ON position.

In response to the ON operation of the IG switch 402 at a time t1 (FIG. 4A), the power consumption reduction module 43 identifies the IG switch 402 to be in the ON position (step S102: Yes). The power consumption reduction module 43 then sets an on/off control signal 244 (FIG. 1) to an ON signal and outputs the ON signal to the FC inverter switch 246, while setting an on/off control signal 204 (FIG. 1) to an ON signal and outputting the ON signal to the cell monitor switch 242 (step S104). This series of processing turns both the FC inverter switch 246 and the cell monitor switch 242 ON at the time t1 as shown in FIGS. 4C and 4E.

As shown in FIG. 1, the ON operation of the FC inverter switch 246 starts the power supply from the battery 30 to the series of pumps 20, whereas the ON operation of the cell monitor switch 242 starts the power supply from the battery 30 to the cell monitor 24. The power supply to the cell monitor 24 drives the cell monitor 24 to start detecting the cell voltage in the fuel cell stack 10 as shown in FIG. 4F. Although the timing chart of FIG. 4F shows a variation of the cell voltage, not only the cell voltage but other diverse data relating to the fuel cell stack 10, such as an output electric current and an internal temperature, may be detected by the cell monitor 24.

Referring back to FIG. 2, the power consumption reduction module 43 subsequently identifies whether the start switch 404 is in the ON position or in the OFF position (step S106). When the start switch 404 is still set in the OFF position, the power consumption reduction module 43 determines whether a time 't' elapsed since the ON operation of the IG switch 402 is equal to or longer than 5 seconds (step S108). When the elapsed time 't' is shorter than 5 seconds, the processing flow returns to step S106 and repeats this series of processing until the elapsed time 't' reaches 5 seconds or until the start switch 404 is turned ON. The criterion of the elapsed time 't' is set to 5 seconds at step S108 in this embodiment but may be set to any other suitable value. The procedure of this embodiment sets the time criterion to 5 seconds, since it is highly probable that the OFF position of the start switch 404 continues for a while longer when the start switch 404 has not been turned ON within 5 seconds since the ON operation of the IG switch 402.

When 5 seconds have elapsed since the ON operation of the IG switch 402 (at a time t2 in FIG. 4), the power consumption reduction module 43 determines that the elapsed time 't' is equal to or longer than 5 seconds (step S108: Yes) and subsequently determines whether the scanning tool 50 is powered ON (step S110). At this moment, the scanning tool 50 has not yet been powered ON, so that the power consumption reduction module 43 determines that the scanning tool 50 is in the OFF condition (step S110: No). The power consumption reduction module 43 then sets the on/off control signal 204 (FIG. 1) to an OFF signal and outputs the OFF signal to the cell monitor switch 242 (step S111), while setting the on-off control signals 244 (FIG. 1) to an OFF signal and outputting the OFF signal to the FC inverter switch 246 (step S112).

This series of processing turns both the cell monitor switch 242 and the FC inverter switch 246 OFF at the time t2 as shown in FIGS. 4C and 4E. The OFF operations of the cell monitor switch 242 and the FC inverter switch 246 stop the power supply from the battery 30 to the cell monitor 24 and to the series of pumps 20. The stop of the power supply to the cell monitor 24 causes the cell monitor 24 to have no detection of the cell voltage of the fuel cell stack 10 24 after the time t2 as shown in FIG. 4F.

Referring to FIG. 3, the power consumption reduction module 43 subsequently determines whether the scanning tool 50 is powered ON (step S118). In the OFF condition of the scanning tool 50, the power consumption reduction module 43 sets the on/off control signal 204 (FIG. 1) to the OFF signal and outputs the OFF signal to the cell monitor switch 242 (step S122) and subsequently determines whether the start switch 404 is in the ON position or in the OFF position (step S124). In the OFF position of the start switch 404, the processing flow returns to step S118 and repeats this series of processing until the scanning tool 50 is powered ON or until the start switch 404 is turned ON.

When the scanning tool 50 is powered ON at a time t3 (FIG. 4D), the power consumption reduction module 43 determines that the scanning tool 50 is in the ON condition (step S118: Yes). The power consumption reduction module 43 then sets the on/off control signal 204 (FIG. 1) to the ON signal and outputs the ON signal to the cell monitor switch 242 (step S120). This series of processing turns the cell monitor switch 242 ON to start the power supply from the battery 30 to the cell monitor 24 at the time t3 as shown in FIG. 4E and reactivates the cell monitor 24 to resume the detection of the cell voltage (FIG. 4F).

The power consumption reduction module 43 subsequently identifies whether the start switch 404 is in the ON position or in the OFF position (step S124). In the OFF position of the start switch 404, the processing flow returns to step S118 and repeats this series of processing until the start switch 404 is turned ON. Until the start switch 404 is turned ON after the power-ON operation of the scanning tool 50, the FC inverter switch 246 is kept OFF, while the cell monitor switch 242 is in the ON position (see FIGS. 4C and 4E). This procedure desirably reduces the electric power consumed by the series of pumps 20, while allowing for the power supply to only the cell monitor 24 to detect the cell voltage and the other parameters in the fuel cell stack 10.

When the checker turns the start switch 404 ON at a time t4 (FIG. 4B), the power consumption reduction module 43 identifies the ON position of the start switch 404 (step S124: Yes). The power consumption reduction module 43 then sets the on/off control signal 244 (FIG. 1) to the ON signal and outputs the ON signal to the FC inverter switch 246, while setting the on/off control signal 204 (FIG. 1) to the ON signal and outputs the ON signal to the cell monitor switch 242 (step S126).

This series of processing turns both the FC inverter switch 246 and the cell monitor switch 242 ON at the time t4 as shown in FIGS. 4C and 4E. The cell monitor switch 242 has already been turned ON at the time t3 and is thus kept ON at this moment. The ON operations of the FC inverter switch 246 and the cell monitor switch 242 start the power supply from the battery 30 to the series of pumps 20 and to the cell monitor 24. Concurrently the FC start instruction module 42 gives a start command 202 to the series of pumps 20 to activate the series of pumps 20.

When the start switch 404 is turned ON within 5 seconds after the ON operation of the IG switch 402 (step S106: Yes), the power consumption reduction module terminates its function in the fuel cell system 100. Namely the fuel cell stack 10 starts with both the FC inverter switch 246 and the cell monitor switch 242 kept ON.

Even when 5 seconds have elapsed since the ON operation of the IG switch 402 without turning the start switch 404 ON, as long as the scanning tool 50 is powered ON (step S110: Yes in FIG. 2), the power consumption reduction module 43 sets the on/off control signal 204 to the ON signal and outputs the ON signal to the cell monitor switch 242 (step S128). The power consumption reduction module 43 subsequently sets the on/off control signal 244 to the OFF signal and outputs the OFF signal to the FC inverter switch 246 (step S112). Namely even when 5 seconds have elapsed since the ON operation of the IG switch 402 with the start switch 404 kept OFF, the cell monitor switch 242 is not turned OFF as long as the scanning tool 50 is in the ON condition. This series of processing allows for continuous detection of the cell voltage or another relevant parameter in the fuel cell stack 10.

On the condition that 5 seconds have elapsed since the ON operation of the IG switch 402 (step S108: Yes), when the scanning tool 50 is powered ON (step S118: Yes) after the successive OFF operations of the cell monitor switch 242 and the FC inverter switch 246 (steps S111 and S112), the cell monitor switch 242 is turned ON (step S120). As long as the start switch 404 is kept OFF, the processing of steps S118 through S124 is repeated. During this time period, when the scanning tool 50 is powered OFF (step S118: No), the power consumption reduction module 43 sets the on/off control signal 204 to the OFF signal and outputs the OFF signal to the cell monitor switch 242 to turn the cell monitor switch 242 OFF (step S122). When there is no requirement for detection of data on the fuel cell stack 10 by the cell monitor 24, the scanning tool 50 is powered OFF to stop the power supply to the cell monitor 24. This series of processing effectively reduces the power consumption of the battery 30.

As described above, in this embodiment, when 5 seconds have elapsed between the ON operation of the IG switch 402 and the subsequent ON operation of the start switch 404, the power consumption reduction module 43 detects the input of the first command in the claims of the invention. When the scanning tool 50 is connected and is powered ON, the power consumption reduction module 43 detects the input of the second command in the claims of the invention.

A3. Effects of Embodiment

In a fuel cell system, series of pumps and a cell monitor are part of auxiliary machinery involved in a start of a fuel cell stack. In the conventional fuel cell system, an ON operation of an IG switch starts power supply from a battery to the series of pumps and to the cell monitor to be stood by for a start of the fuel cell stack. The series of pumps and the cell monitor are collectively connected to the battery by means of one common switch. The ON/OFF operations of the common switch control the power supply from the battery to the series of pumps and the cell monitor.

When a start switch is turned ON immediately (within 5 seconds) after the ON operation of the IG switch, the series of pumps are activated to start the fuel cell stack. When the start switch is not turned ON immediately, however, the continuous power supply to the series of pumps and the cell monitor consumes the electric power stored in the battery. This causes a problem of insufficient supply of electric power to the series of pumps and the cell monitor on a start of the fuel cell stack.

In the fuel cell system 100 of the embodiment, the power supply to the series of pumps 20 and to the cell monitor 24 is stopped when 5 seconds have elapsed between the ON operation of the IG switch 402 and the subsequent ON operation of the start switch 404. In response to the ON operation of the start switch 404, the power supply to the series of pumps 20 and to the cell monitor 24 is restarted. This arrangement effectively reduces the power consumption in the battery 30 by the series of pumps 20 and the cell monitor 24 before a start of the fuel cell stack 10.

In the fuel cell system 100, the series of pumps 20 and the cell monitor 24 are separately connected to the battery 30 by means of different switches. Namely the power supply to the series of pumps 20 is controlled independently of the power supply to the cell monitor 24. Even in the state where the power supply to the series of pumps 20 and to the cell monitor 24 is stopped with a view to saving the power consumption, in response to connection and the power-ON operation of the scanning tool 50, the power supply to the cell monitor 24 is forcibly started.

This procedure allows for the forced power supply to the cell monitor 24 according to the requirements, while reducing the power consumption of the battery 30 before a start of the fuel cell stack 10. Data regarding the fuel cell stack 10, for example, the cell voltage, may thus be detectable without starting the fuel cell stack 10.

B. Second Embodiment

B1. Configuration of Embodiment

Figure 5:
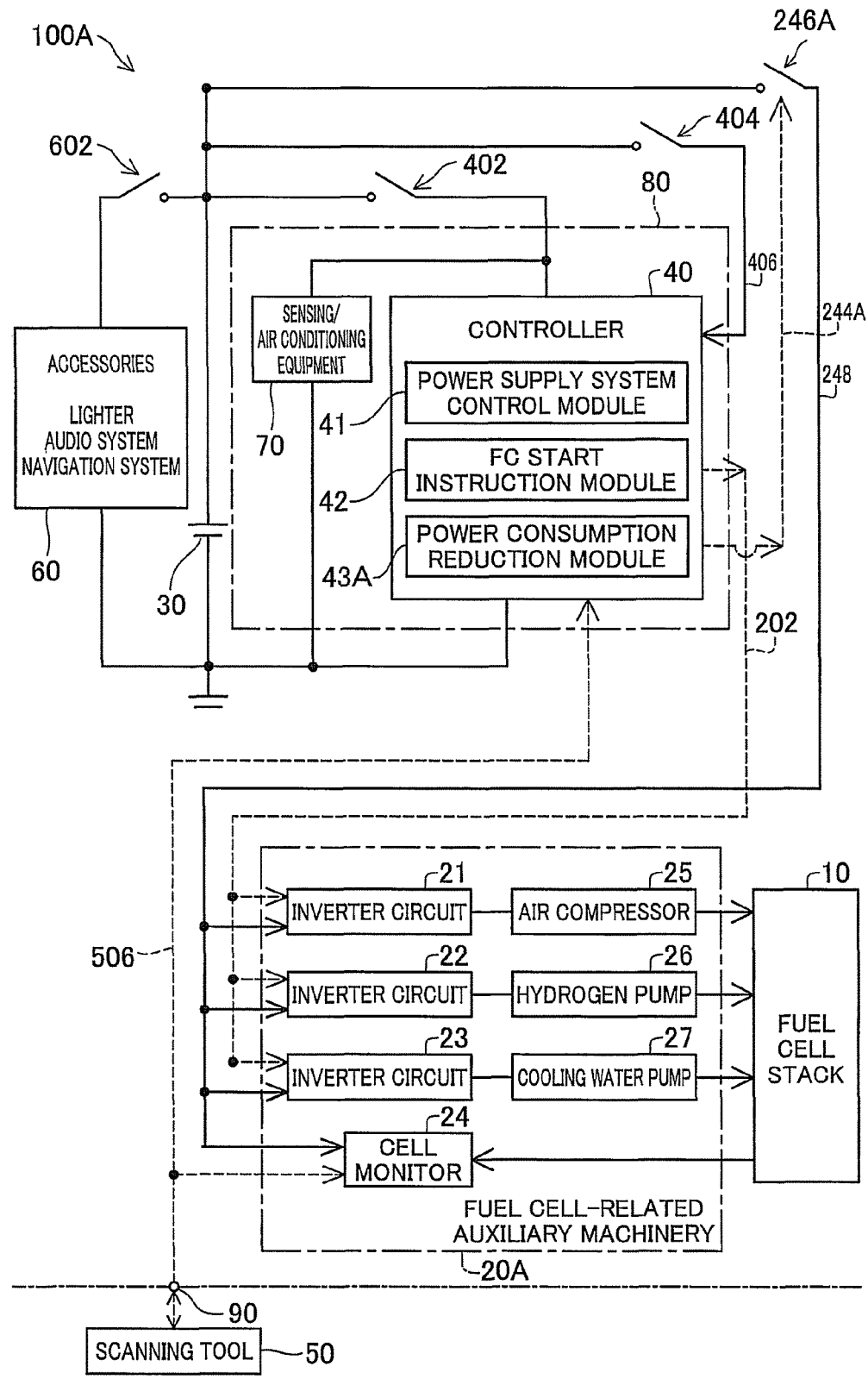
FIG. 5 is an explanatory view illustrating the configuration of another fuel cell system 100A in a second embodiment.

FIG. 5 is an explanatory view illustrating the configuration of another fuel cell system 100A in a second embodiment.

Only the constituents of the fuel cell system 100A different from those of the first embodiment are described below The like constituents to those of the first embodiment are expressed by the like numerals and symbols to those of the first embodiment and are not specifically explained here. As shown in FIG. 5, the objects of power supply by the battery 30 are broadly divided into three groups. The first group 60 and the second group 80 are identical with those of the first embodiment, and the third group represents fuel cell-related auxiliary machinery 20A. The fuel cell-related auxiliary machinery 20A include an air compressor 25, a hydrogen pump 26, a cooling water pump 27, inverter circuits 21, 22, and 23 respectively activated to drive and operate these compressor and pumps, and a cell monitor 24. In the configuration of the first embodiment, the electric power from the battery 30 is separately supplied to the series of pumps 20 and to the cell monitor 24. In the configuration of this embodiment, on the other hand, the electric power from the battery 30 is collectively supplied to the fuel cell-related auxiliary machinery 20A.

A fuel cell-related auxiliary machinery switch 246A is thus provided between the fuel cell-related auxiliary machinery 20A as the third group and the battery 30. Like the FC inverter switch 246 of the first embodiment, the fuel cell-related auxiliary machinery switch 246A is controlled by the function of a power consumption reduction module 43A in the controller 40, without requiring the driver's manual operation. In an ON position of the fuel cell-related auxiliary machinery switch 246A, the electric power from the battery 30 is supplied to the inverter circuits 21, 22, and 23 and to the cell monitor 24. In an OFF position of the fuel cell-related auxiliary machinery switch 246A, on the other hand, the power supply is stopped.

B2. Operations of Embodiment

Figure 6:
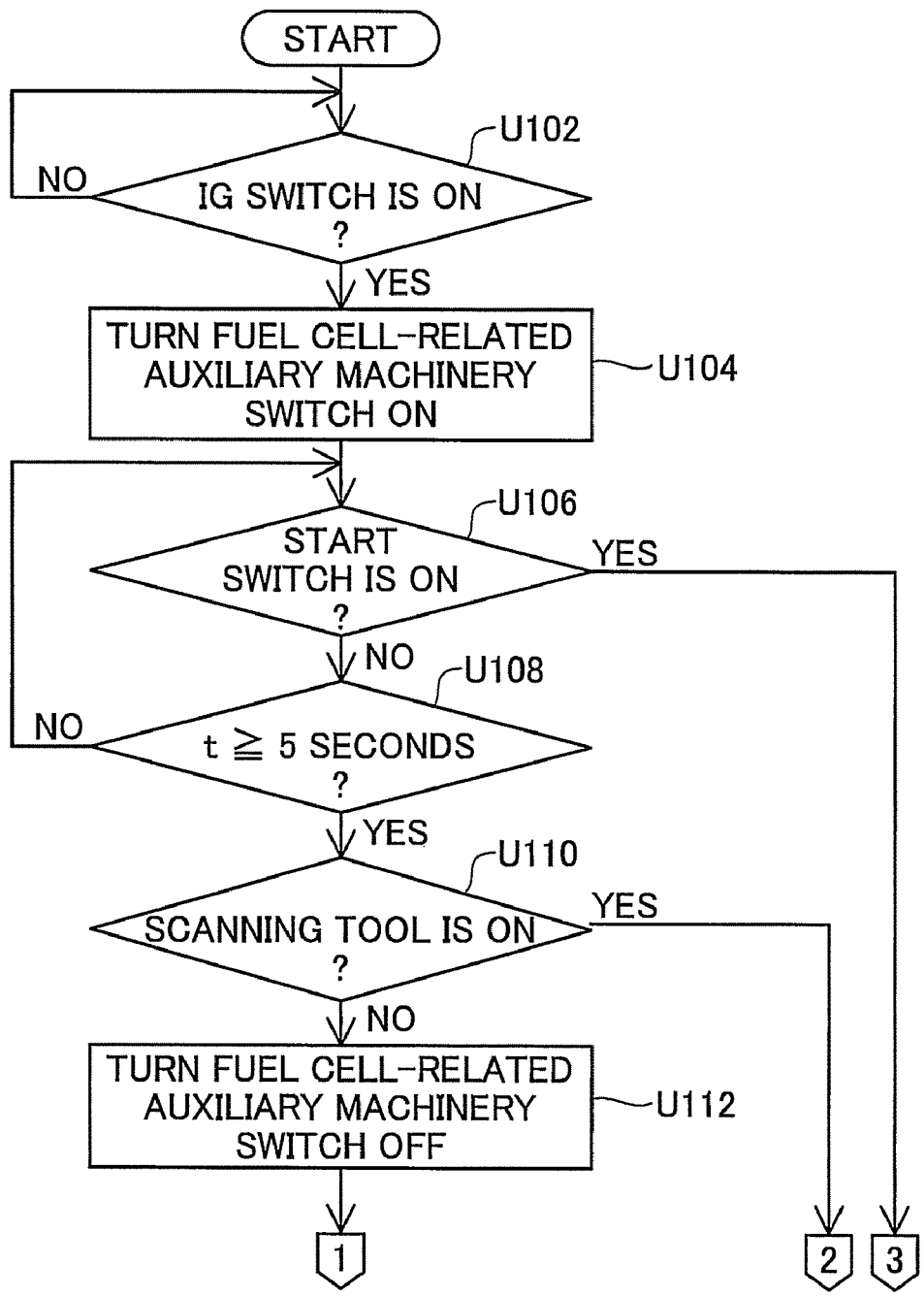
FIG. 6 is a flowchart showing a procedure for reducing the power consumption on a start of the fuel cell system 100A.
Figure 7:
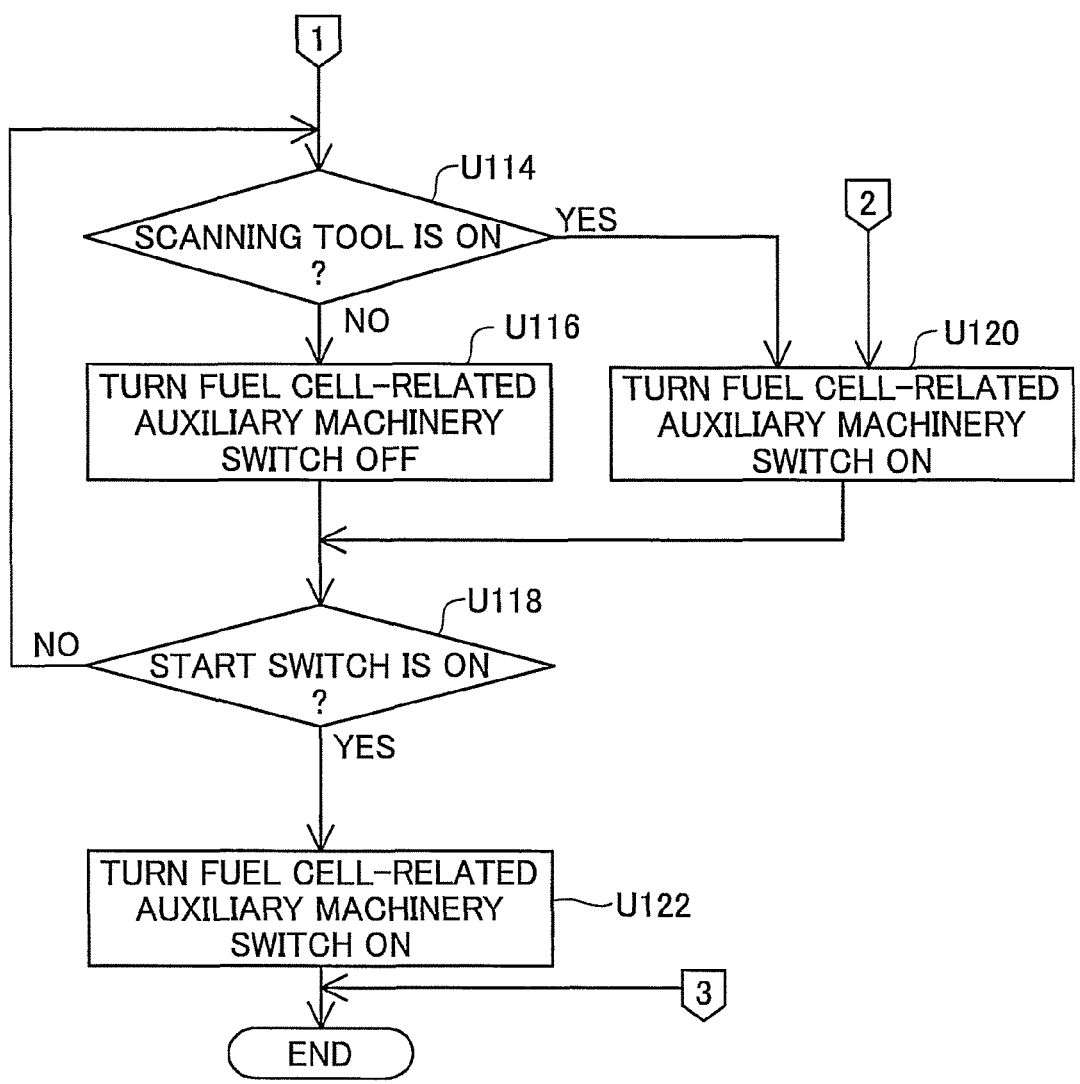
FIG. 7 is a flowchart showing the procedure for reducing the power consumption on a start of the fuel cell system 100A.
Figure 8:
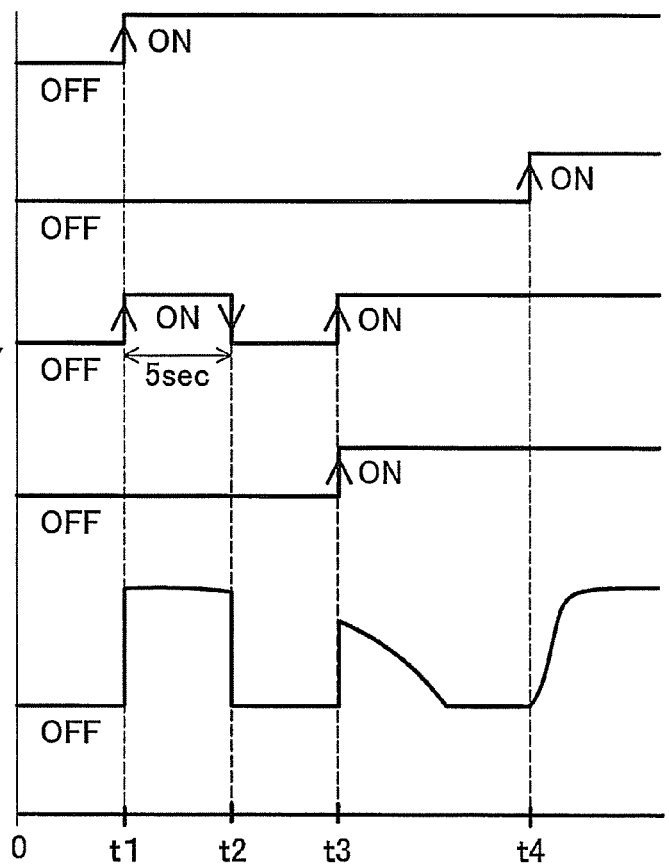
FIG. 8 is timing charts showing on-off timings of the respective switches in the fuel cell system 100A.

FIGS. 6 and 7 are flowcharts showing a procedure for reducing the power consumption on a start of the fuel cell system 100A. FIG. 8 is timing charts showing on-off timings of the respective switches in the fuel cell system 100A. As explained above, unlike the first embodiment, in the configuration of the second embodiment, the inverter circuits 21 through 23 and the cell monitor 24 are included in the same group as the object of power supply, and the fuel cell-related auxiliary machinery switch 246A is provided between this group (fuel cell-related auxiliary machinery 20A) and the battery 30. The controller 40 of the second embodiment thus performs a different power consumption reduction program from the program performed in the fuel cell system 100 of the first embodiment.

Like the first embodiment, a procedure of checking the condition of the fuel cell stack 10 in the connected state of the scanning tool 50 with the input/output terminals 90 by the checker is described below as one exemplified operation of the second embodiment with reference to FIGS. 5 through 8.

Referring to FIG. 6, the power consumption reduction module 43A first identifies whether the IG switch 402 is in the ON position or in the OFF position (step U102). In response to an ON operation of the IG switch 402 at a time t1 (FIG. 8A), the power consumption reduction module 43A identifies the IG switch 402 to be in the ON position (step U102: Yes). The power consumption reduction module 43A then sets an on/off control signal 244A (FIG. 5) to an ON signal and outputs the ON signal to the fuel cell-related auxiliary machinery switch 246A (step U104). This series of processing turns the fuel cell-related auxiliary machinery switch 246A ON at the time t1 as shown in FIG. 8C.

As shown in FIG. 5, the ON operation of the fuel cell-related auxiliary machinery switch 246A starts the power supply from the battery 30 to the fuel cell-related auxiliary machinery 20A. The power supply to the fuel cell-related auxiliary machinery 20A supplies electric power to the cell monitor 24 and accordingly drives the cell monitor 24 to start detecting the cell voltage in the fuel cell stack 10 as shown in FIG. 8E.

The power consumption reduction module 43A subsequently identifies whether the start switch 404 is in the ON position or in the OFF position (step U106). When the start switch 404 is still set in the OFF position, the power consumption reduction module 43A determines whether a time 't' elapsed since the ON operation of the IG switch 402 is equal to or longer than 5 seconds (step U108). When the elapsed time is shorter than 5 seconds, the processing flow returns to step U106 and repeats this series of processing until the elapsed time 't' reaches 5 seconds or until the start switch 404 is turned ON.

When 5 seconds have elapsed since the ON operation of the IG switch 402 (at a time t2 in FIG. 8), the power consumption reduction module 43A determines that the elapsed time 't' is equal to or longer than 5 seconds (step U108: Yes) and subsequently determines whether the scanning tool 50 is powered ON (step U110). At this moment, the scanning tool 50 has not yet been powered ON, so that the power consumption reduction module 43A determines that the scanning tool 50 is in the OFF condition (step U110: No). The power consumption reduction module 43A then sets the on/off control signal 244A (FIG. 5) to an OFF signal and outputs the OFF signal to the fuel cell-related auxiliary machinery switch 246A (step U112).

This series of processing turns the fuel cell-related auxiliary machinery switch 246A OFF at the time t2 as shown in FIG. 8C. The OFF operation of the fuel cell-related auxiliary machinery switch 246A stops the power supply from the battery 30 to the fuel cell-related auxiliary machinery 20A. The stop of the power supply causes the cell monitor 24 to have no detection of the cell voltage after the time t2 as shown in FIG. 8E.

Referring to FIG. 7, the power consumption reduction module 43A subsequently determines whether the scanning tool 50 is powered ON (step U114). In the OFF condition of the scanning tool 50, the power consumption reduction module 43A sets the on/off control signal 244A (FIG. 5) to the OFF signal and outputs the OFF signal to the fuel cell-related auxiliary machinery switch 246A (step U116) and subsequently determines whether the start switch 404 is in the ON position or in the OFF position (step U118). In the OFF position of the start switch 404, the processing flow returns to step U114 and repeats this series of processing until the scanning tool 50 is powered ON or until the start switch 404 is turned ON.

When the scanning tool 50 is powered ON at a time t3 (FIG. 8D), the power consumption reduction module 43A determines that the scanning tool 50 is in the ON condition (step U114: Yes). The power consumption reduction module 43A then sets the on/off control signal 244A (FIG. 5) to the ON signal and outputs the ON signal to the fuel cell-related auxiliary machinery switch 246A (step U120). This series of processing turns the fuel cell-related auxiliary machinery switch 246A ON to start the power supply from the battery 30 to the fuel cell-related auxiliary machinery 20A at the time t3 as shown in FIG. 8C. The start of the power supply to the cell monitor 24 causes the cell monitor 24 to detect the cell voltage after the time t3 (FIG. 8E).

The power consumption reduction module 43A subsequently identifies whether the start switch 404 is in the ON position or in the OFF position (step U118). In the OFF position of the start switch 404, the processing flow returns to step U114 and repeats this series of processing until the start switch 404 is turned ON. When the checker turns the start switch 404 ON, the power consumption reduction module 43A identifies the ON position of the start switch 404 (step U118: Yes). The power consumption reduction module 43A then sets the on/off control signal 244A to the ON signal and outputs the ON signal to the fuel cell-related auxiliary machinery switch 246A (step U122).

This series of processing turns the fuel cell-related auxiliary machinery switch 246A ON at a time t4 as shown in FIG. 8C. The fuel cell-related auxiliary machinery switch 246A has already been turned ON at the time t3 and is thus kept ON at this moment. The ON operation of the fuel cell-related auxiliary machinery switch 246A starts the power supply from the battery 30 to the fuel cell-related auxiliary machinery 20A. Concurrently the FC start instruction module 42 gives a start command 202 to the inverter circuits 21 through 23 to activate the air compressor 25, the hydrogen pump 26, and the cooling water pump 27 and thereby start the operation of the fuel cell stack 10.

Even when 5 seconds have elapsed since the ON operation of the IG switch 402 without turning the start switch 404 ON, as long as the scanning tool 50 is powered ON (step U110: Yes in FIG. 6), the power consumption reduction module 43A sets the on/off control signal 244A to the ON signal and outputs the ON signal to the fuel cell-related auxiliary machinery switch 246A (step U120). Namely even when 5 seconds have elapsed since the ON operation of the IG switch 402 with the start switch 404 kept OFF, the on/off control signal 244A is not set to the OFF signal as long as the scanning tool 50 is in the ON condition. This series of processing allows the cell monitor 24 to continuously detect the cell voltage or another relevant parameter in the fuel cell stack 10 and assures the continuous power supply to the inverter circuits 21 through 23 in the ON condition of the scanning tool 50.

B3. Effects of Embodiment

Unlike the first embodiment, the fuel cell system 100A of the second embodiment collectively controls the power supply from the battery 30 to the fuel cell-related auxiliary machinery 20A. When the scanning tool 50 is connected to the input/output terminals 90 and is powered ON, the electric power is supplied to the whole fuel cell-related auxiliary machinery 20A. Even when 5 seconds have elapsed in the ON position of the IG switch 402 and in the OFF position of the start switch 404, the connection of the scanning tool 50 starts the power supply from the battery 30 to the inverter circuits 21 through 23. This enables software programs for the inverter circuits 21 through 23 to be rewritten without external supply of electric power.

C. Third Embodiment

C1. Configuration of Embodiment

Figure 9:
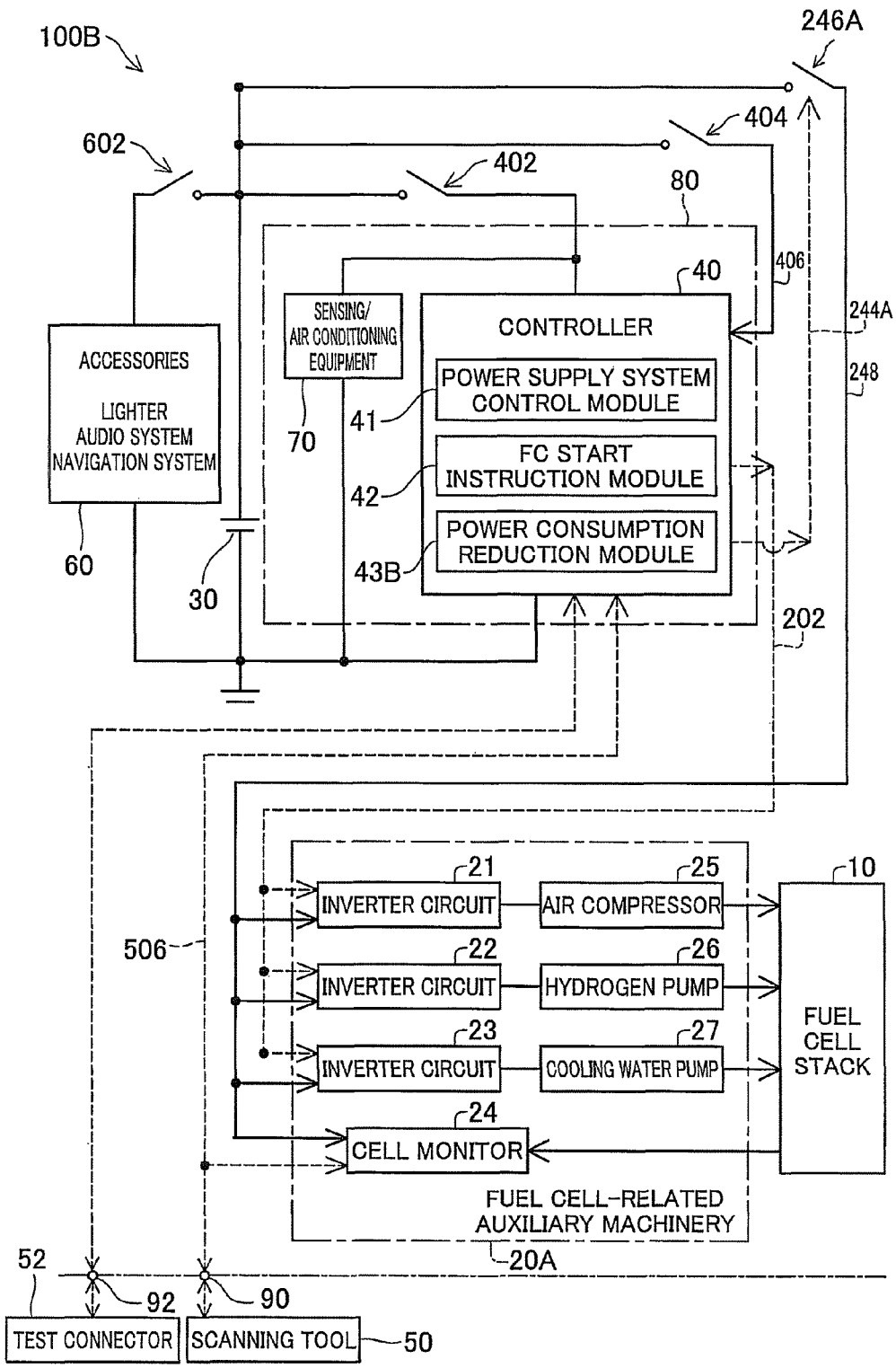
FIG. 9 is an explanatory view illustrating the configuration of still another fuel cell system 100B in a third embodiment.

FIG. 9 is an explanatory view illustrating the configuration of still another fuel cell system 100B in a third embodiment. Only the constituents of the fuel cell system 100B different from those of the second embodiment are described below. The like constituents to those of the second embodiment are expressed by the like numerals and symbols to those of the second embodiment and are not specifically explained here.

As shown in FIG. 9, the fuel cell system 100B of the third embodiment has input/output terminals 92, in addition to the constituents of the fuel cell system 100A of the second embodiment.

A test connector 52 is connectable to the input/output terminals 92. The test connector 52 is a checkup device for diagnosis of failure like the scanning tool 50 used as the checkup device in the first and the second embodiments discussed above but has a simpler structure than that of the scanning tool 50. Connection of the test connector 52 with the input/output terminals 92 grounds one of resistances (not shown) included in the controller 40. In this embodiment, in response to grounding the resistance in the controller 40, a power consumption reduction module 43B detects connection of the test connector 52 (checkup device).

The scanning tool 50 of this embodiment has a forced drive mode. The forced drive mode forcibly drives the fuel cell stack 10 for the forced power supply to the fuel cell-related arbitrary machinery 20A. When the checker selects the forced drive mode in the scanning tool 50, an ON request for the fuel cell-related auxiliary machinery 20A, hereafter may simply be referred to as 'ON request', is input from the scanning tool 50 to the controller 40. The power consumption reduction module 43B then identifies the ON request from the scanning tool 50. In response to the ON request from the scanning tool 50, the power consumption reduction module 43B detects connection of the checkup device. The scanning tool 50 and the test connector 52 of this embodiment are equivalent to the checkup device in the claims of the invention.

The power consumption reduction module 43B of this embodiment detects the connection of the checkup device both in the case of connection of the scanning tool 50 and in the case of connection of the test connector 52 as explained later and starts the power supply to the fuel cell-related auxiliary machinery 20A. The scanning tool 50 and the test connector 52 adopt different criteria for detecting the connection of the checkup device as explained above.

The scanning tool 50 (may be called service tool) is a fault diagnosis device that is generally used by a service representative, who is in charge of checking and servicing in an automobile dealer, to check for any trouble or fault in the fuel cell stack 10 and obtain various pieces of information on the fuel cell stack 10. The test connector 52 (may be called diagnosis checker) is generally used by each general user to obtain simple pieces of information on the fuel cell stack 10. In this embodiment, information on the cell voltage is sent from the cell monitor 24 via the controller 40 to either the scanning tool 50 or the test connector 52.

C2. Operations of Embodiment

Figure 10:
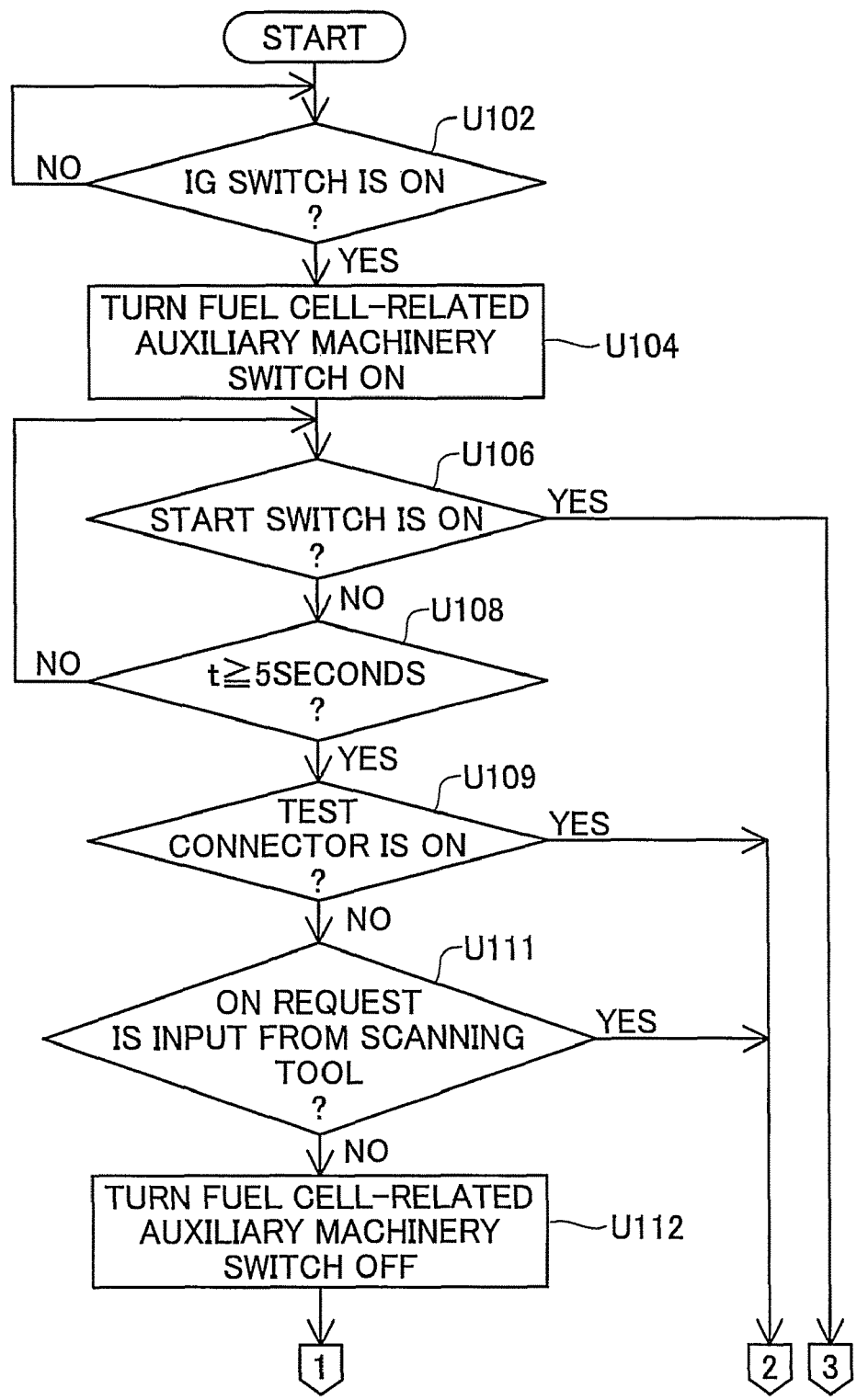
FIG. 10 is a flowchart showing a procedure for reducing the power consumption on a start of the fuel cell system 100B.
Figure 11:
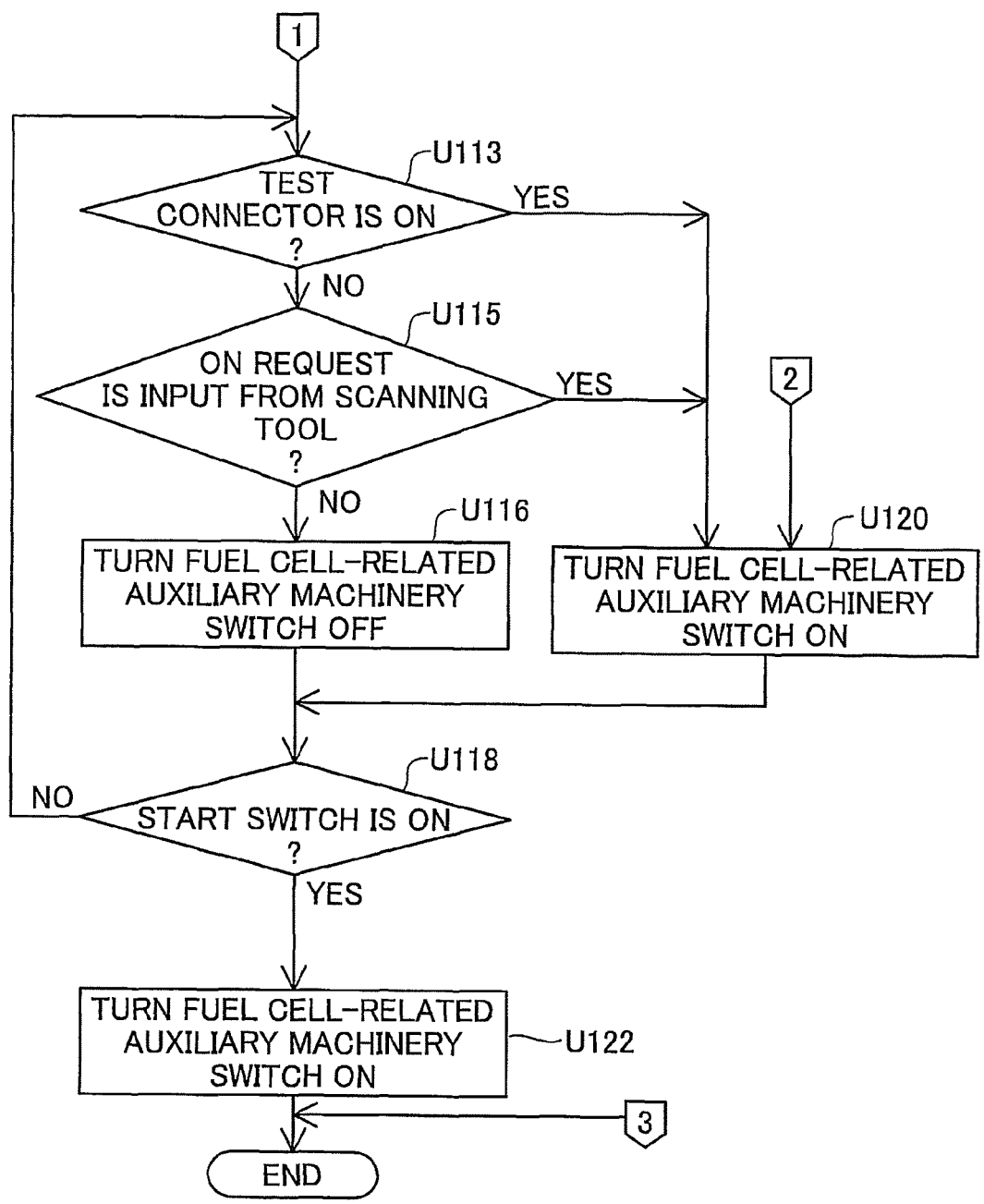
FIG. 11 is a flowchart showing the procedure for reducing the power consumption on a start of the fuel cell system 100B.

FIGS. 10 and 11 are flowcharts showing a procedure for reducing the power consumption on a start of the fuel cell system 100B. FIG. 12 is timing charts showing on-off timings of the respective switches in the fuel cell system 100B. Unlike the second embodiment, the power consumption reduction module 43B of the third embodiment detects the connection of the checkup device both in the case of connection of the scanning tool 50 and in the case of connection of the test connector 52 and starts the power supply to the fuel cell-related auxiliary machinery 20A. The controller 40 of the third embodiment thus performs a different power consumption reduction program from the program performed in the fuel cell system 100A of the second embodiment.

A procedure of checking the condition of the fuel cell stack 10 in the connected state of the test connector 52 with the input/output terminals 92 by the checker is described below as one exemplified operation of the third embodiment with reference to FIGS. 10 through 12. The same steps in FIGS. 10 and 11 as those in the second embodiment are shown by the same step numbers.

Referring to FIG. 10, like the procedure of the second embodiment, the power consumption reduction module 43B first identifies whether the IG switch 402 is in the ON position or in the OFF position (step U102). In response to an ON operation of the IG switch 402 at a time t1 (FIG. 12A), the power consumption reduction module 43B identifies the IG switch 402 to be in the ON position (step U102: Yes). The power consumption reduction module 43B then sets an on/off control signal 244A (FIG. 9) to an ON signal and outputs the ON signal to the fuel cell-related auxiliary machinery switch 246A (step U104). This series of processing turns the fuel cell-related auxiliary machinery switch 246A ON at the time t1 as shown in FIG. 12C.

As shown in FIG. 9, the ON operation of the fuel cell-related auxiliary machinery switch 246A starts the power supply from the battery 30 to the fuel cell-related auxiliary machinery 20A and thereby supplies electric power to the cell monitor 24. The cell monitor 24 is then driven to start detecting the cell voltage in the fuel cell stack 10 as shown in FIG. 12F.

The power consumption reduction module 43B subsequently identifies whether the start switch 404 is in the ON position or in the OFF position (step U106). When the start switch 404 is still set in the OFF position, the power consumption reduction module 43B determines whether a time 't' elapsed since the ON operation of the IG switch 402 is equal to or longer than 5 seconds (step U108). When the elapsed time 't' is shorter than 5 seconds, the processing flow returns to step U106 and repeats this series of processing until the elapsed time 't' reaches 5 seconds or until the start switch 404 is turned ON.

When 5 seconds have elapsed since the ON operation of the IG switch 402 (at a time t2 in FIG. 12), the power consumption reduction module 43B determines that the elapsed time 't' is equal to or longer than 5 seconds (step U108: Yes) and subsequently determines whether the test connector 52 is ON (step U109). At this moment, the test connector 52 has not yet been connected, so that the power consumption reduction module 43B determines that the test connector 52 is in the OFF condition (step U109: No). The power consumption reduction module 43B subsequently determines whether the ON request explained above is input from the scanning tool 50 (step U111). In this example, the scanning tool 50 is not connected, so that the power consumption reduction module 43B determines that the ON request is not input from the scanning tool 50 (step U111: No). The power consumption reduction module 43B then sets the on/off control signal 244A (FIG. 9) to an OFF signal and outputs the OFF signal to the fuel cell-related auxiliary machinery switch 246A (step U112).

This series of processing turns the fuel cell-related auxiliary machinery switch 246A OFF at the time t2 as shown in FIG. 12C. The OFF operation of the fuel cell-related auxiliary machinery switch 246A stops the power supply from the battery 30 to the fuel cell-related auxiliary machinery 20A. The stop of the power supply causes the cell monitor 24 to have no detection of the cell voltage after the time t2 as shown in FIG. 12F.

Referring to FIG. 11, the power consumption reduction module 43B subsequently determines whether the test connector 52 is ON (step U113). In the OFF condition of the test connector 52, the power consumption reduction module 43B subsequently determines whether the ON request is input from the scanning tool 50 (step U115). When there is no ON request input from the scanning tool 50, the power consumption reduction module 43B sets the on/off control signal 244A (FIG. 9) to the OFF signal and outputs the OFF signal to the fuel cell-related auxiliary machinery switch 246A (step U116) and subsequently determines whether the start switch 404 is in the ON position or in the OFF position (step U118). In the OFF position of the start switch 404, the processing flow returns to step U113 and repeats this series of processing until the test connector 52 or the start switch 404 is turned ON or until the ON request is input from the scanning tool 50 to the controller 40.

When the test connector 52 is connected at a time t3 (FIG. 12D), the power consumption reduction module 43B determines that the test connector 52 is ON (step U113: Yes). The power consumption reduction module 43B then sets the on/off control signal 244A (FIG. 9) to the ON signal and outputs the ON signal to the fuel cell-related auxiliary machinery switch 246A (step U120). This series of processing turns the fuel cell-related auxiliary machinery switch 246A ON to start the power supply from the battery 30 to the fuel cell-related auxiliary machinery 20A at the time t3 as shown in FIG. 12C. The start of the power supply to the cell monitor 24 causes the cell monitor 24 to detect the cell voltage after the time t3 (FIG. 12F).

The power consumption reduction module 43B subsequently identifies whether the start switch 404 is in the ON position or in the OFF position (step U118). In the OFF position of the start switch 404, the processing flow returns to step U113 and repeats this series of processing until the start switch 404 is turned ON. When the checker turns the start switch 404 ON, the power consumption reduction module 43B identifies the ON position of the start switch 404 (step U118: Yes). The power consumption reduction module 43B then sets the on/off control signal 244A to the ON signal and outputs the ON signal to the fuel cell-related auxiliary machinery switch 246A (step U122).

This series of processing turns the fuel cell-related auxiliary machinery switch 246A ON at a time t4 as shown in FIG. 12C. The fuel cell-related auxiliary machinery switch 246A has already been turned ON at the time t3 and is thus kept ON at this moment. The ON operation of the fuel cell-related auxiliary machinery switch 246A starts the power supply from the battery 30 to the fuel cell-related auxiliary machinery 20A. Concurrently the FC start instruction module 42 gives a start command 202 to the inverter circuits 21 through 23 to activate the air compressor 25, the hydrogen pump 26, and the cooling water pump 27 and thereby start the operation of the fuel cell stack 10.

Even when 5 seconds have elapsed since the ON operation of the IG switch 402 (step U102: Yes in FIG. 10) without turning the start switch 404 ON (step U108: Yes), as long as the test connector 52 is ON (connected) (step U109: Yes), the power consumption reduction module 43B sets the on/off control signal 244A to the ON signal and outputs the ON signal to the fuel cell-related auxiliary machinery switch 246A (step U120). When there is the ON request input from the scanning tool 50 (step U111: Yes) with the test connector 52 unconnected (step S109: No), the power consumption reduction module 43B also sets the on/off control signal 244A to the ON signal and outputs the ON signal to the fuel cell-related auxiliary machinery switch 246A (step U120). Namely even when 5 seconds have elapsed since the ON operation of the IG switch 402 with the start switch 404 kept OFF, the fuel cell-related auxiliary machinery switch 246A is not turned OFF as long as the test connector 52 is ON or there is the ON request input from the scanning tool 50. This series of processing allows the cell monitor 24 to continuously detect the cell voltage or another relevant parameter in the fuel cell stack 10 and assures the continuous power supply to the inverter circuits 21 through 23.

C3. Effects of Embodiment

In the fuel cell system 100B of the third embodiment, unlike the second embodiment, when the test connector 52 is connected to the input/output terminals 92 or when the scanning tool 50 is connected to the input/output terminals 90 and outputs the ON request, the electric power is supplied to the whole fuel cell-related auxiliary machinery 20A. Even in the OFF position of the start switch 404 with the IG switch 402 kept ON, the connection of the test connector 50 or the ON request output from the scanning tool 50 assures the power supply to the fuel cell-related auxiliary machinery 20A. This allows for detection of the information on the cell voltage and enables software programs for the inverter circuits 21 through 23 to be rewritten without external supply of electric power.

D. Other Aspects

The embodiments and their applications discussed above are to be considered in all aspects as illustrative and not restrictive. There may be many modifications, changes, and alterations without departing from the scope or spirit of the main characteristics of the present invention. Some examples of possible modification are given below.

(1) On the condition that 5 seconds have elapsed since the ON operation of the IG switch 402 without turning the start switch 404 ON, the procedure of any of the above embodiments reduces the power supply from the battery 30 to the fuel cell-related auxiliary machinery. This condition is, however, neither essential nor restrictive, but other diverse conditions may be set for the same purpose. One modified procedure may detect the state of charge in the battery 30 in the OFF position of the start switch 404 with the IG switch 402 kept ON and, in response to a decrease of the state of charge to a preset level, reduce the power supply from the battery 30 to the fuel cell-related auxiliary machinery.

(2) Another modified procedure may detect the state of the user and reduce the power supply from the battery 30 to the fuel cell-related auxiliary machinery according to the result of the detection. For example, the procedure may detect the presence or the absence of a driver on the driver's seat, assume that the start switch 404 will not be turned ON for a while in the absence of the driver, and reduce the power supply.

(3) Any of the fuel cell systems 100, 100A, and 100B described above as the first through the third embodiments is mounted on the vehicle. This is, however, neither essential nor restrictive. The technique of the invention is similarly applicable to a stationary fuel cell system to reduce the power consumption under predetermined conditions.

(4) The fuel cell systems 100, 100A, and 100B of the above embodiments use the polymer electrolyte fuel cells. Any of these fuel cell systems may use other diverse type of fuel cells, for example, phosphoric-acid fuel cells, molten carbonate fuel cells, and solid oxide fuel cells.

(5) In the embodiments discussed above, the scanning tool 50 and the test connector 52 are used as the checkup device. Any other suitable checkup device may be used instead. In the first and the second embodiments, when the scanning tool 50 is connected and is powered ON, the power consumption reduction module 43 or 43A determines that the scanning tool 50 is in the ON condition ('connection of the checkup device' in the claims of the invention). In the third embodiment, when the test connector 52 is connected (when a certain resistance in the controller 40 is grounded), the power consumption reduction module 43B determines that the test connector 52 is ON ('connection of the checkup device' in the claims of the invention). When there is the ON request input from the scanning tool 50, the power consumption reduction module 43B determines that that the scanning tool 50 is in the ON condition ('connection of the checkup device' in the claims of the invention). The criterion (timing) for determining the connection of the checkup device is, however, not restricted to these examples. For example, in the first embodiment, in response to a request for the information on the cell voltage from the scanning tool 50, the power consumption reduction module 43 may determine the 'connection of the checkup device' and turn the cell monitor switch 242 ON.

The invention claimed is:

1. A fuel cell system, comprising:
   a plurality of fuel cells;
   a power source;
   a fuel cell monitoring device for measuring a cell voltage of the fuel cells, and
   a power supply controller configured to, upon satisfaction of a predetermined condition prior to a start of the fuel cells but while power is being supplied at a preset electric power level from the power source to the fuel cell monitoring device, stop supplying power to the fuel cell monitoring device until input of a start instruction to start the fuel cells,
   wherein upon determination that a checkup device used for detecting deterioration of the fuel cells based on the cell voltage of the fuel cells measured by the fuel cell monitoring device is connected with the fuel cell system, the power supply controller issues an instruction to supply power at the preset electric power level from the power source to the fuel cell monitoring device, irrespective of satisfaction or dissatisfaction of the predetermined condition.

2. The fuel cell system in accordance with claim 1, wherein the power source is a low-voltage battery.

3. The fuel cell system in accordance with claim 1, wherein the predetermined condition is that a preset time period has elapsed between input of a power supply instruction to start supplying power to the fuel cell monitoring device and the input of the start instruction to start the fuel cells.

4. The fuel cell system in accordance with claim 1, the fuel cell system further including:
   a first operator arranged to output a power supply instruction to start supplying power to the fuel cell monitoring device; and
   a second operator arranged to output the start instruction to start the fuel cells,
   wherein the predetermined condition is that a preset time period has elapsed between activation of the first operator and activation of the second operator.

* * * * *